United States Patent [19]

Gutweiler

[11] 4,212,765
[45] Jul. 15, 1980

[54] PROCESS FOR THE MANUFACTURE OF A CATALYST

[75] Inventor: Klemens Gutweiler, Niedernhausen, Fed. Rep. of Germany

[73] Assignee: Hoechst Aktiengesellschaft, Frankfurt am Main, Fed. Rep. of Germany

[21] Appl. No.: 5,509

[22] Filed: Jan. 22, 1979

[30] Foreign Application Priority Data

Jan. 23, 1978 [DE] Fed. Rep. of Germany ....... 2802763

[51] Int. Cl.² .......................... C08F 4/02; C08F 4/22; C08F 4/78
[52] U.S. Cl. .................................. 252/430; 252/428; 252/431 R; 526/129; 526/153; 526/156; 526/169
[58] Field of Search .................... 252/428, 430, 431 R

[56] References Cited

U.S. PATENT DOCUMENTS

| 3,071,601 | 1/1963 | Aries | 252/430 X |
| 3,412,174 | 11/1968 | Kroll | 252/428 X |
| 3,493,554 | 2/1970 | Rexers | 252/431 R X |
| 3,984,351 | 10/1976 | Rexers et al. | 252/431 R X |

Primary Examiner—Patrick Garvin
Attorney, Agent, or Firm—Curtis, Morris & Safford

[57] ABSTRACT

A catalyst for the polymerization of 1-olefins is prepared by reacting a chromate ester fixed on a carrier selected from the group consisting of oxides of silicon, oxides of aluminum, and mixtures of said oxides, in the absence of an unsaturated polymerizable hydrocarbon, with an aluminum-organic compound and subsequently activating with aluminum-organic compound. No washing liquids that have to be worked up are obtained and the polymers, obtained in a high yield have a broad molecular weight distribution and contain only a small proportion of high molecular constituents. The films made therefrom are practically free from specks.

32 Claims, No Drawings

PROCESS FOR THE MANUFACTURE OF A CATALYST

This invention relates to a process for the manufacture of a mixed catalyst of the Ziegler type and to the catalyst obtained by this process.

Processes for polymerizing 1-olefins have been proposed using a catalyst consisting of a chromate ester fixed on a carrier and an aluminum-organic compound (cf. DE-OS Nos. 2,000,031 and 1,745,184). The yield obtained in these processes are, however, not sufficient for a further processing of the polymer without removal of the catalyst remainders.

Another process for polymerizing ethylene has been proposed according to which the catalyst used consists of a chromate ester precipitated on a $SiO_2$ carrier and treated with a phenol compound and a strong reducing agent (cf. DE-OS No. 2,713,877). Though the phenol treatment increases the yield, it still does not enable one to carry out a polymerization process without removal of the catalyst from the polymer.

It has now been found that very high polymer yields are obtained when a catalyst is used which has been prepared by fixing a chromate ester on a carrier, pretreating with an aluminum-organic compound in the absence of polymerizable hydrocarbon and activating for polymerization with an aluminum-organic compound.

It is, therefore, the object of the present invention to provide a process for the manufacture of a catalyst of applying a chromate ester to a carrier containing silicon dioxide, treating the chromium compound fixed on the carrier with a reducing agent and mixing the reaction product (component A) with an aluminum-organic compound (component B), wherein component A is prepared by applying a chromate ester of the formula $(RO)_2CrO_2$, in which R denotes a tertiary alkyl or aralkyl group having from 4 to 24 carbon atoms, to an oxide or mixed oxide of silicon and/or aluminum and treating the chromium compound fixed on the carrier, in the absence of an unsaturated polymerizable hydrocarbon, with a compound selected from the group consisting of aluminum trialkyls, aluminum dialkyl hydrides, aluminum dialkyl alkoxides, reaction products of aluminum trialkyls with dienes, reaction products of aluminum dialkyl hydrides with dienes, and poly-alkyl-aluminum oxides, in a proportion of Cr to Al of 1:1 to 1.50.

It is another object of the present invention to provide the catalyst produced by the above process said catalyst being useful for polymerizing 1-olefins.

For the manufacture of the catalyst, component A, a chromate ester, is fixed on a carrier.

Suitable chromate esters are those of the formula $$(RO)_2CrO_2$$

in which R denotes a tertiary alkyl or aralkyl group having from 4 to 24, preferably 4 to 19, carbon atoms. Chromate esters of this type can be obtained in known manner by reacting a tertiary alcohol of the formula $$R^1R^2R^3COH,$$

in which $R^1$, $R^2$ and $R^3$ are the same or not all the same and each is an alkyl group having from 1 to 15 carbon atoms or aryl group having from 6 to 10 carbon atoms, with $CrO_3$ in an inert solvent in the presence of a waterbinding agent. Alcohols to be used are, for example, tert.-butanol, 2-methyl-2-butanol, tert.-hexanol, dimethylpentadecyl carbinol and triphenyl carbinol, tert. butanol being preferred. The molar ratio of $CrO_3$ to alcohol is in the range of from 1:1 to 10:1, preferably 2:1 to 4:1.

Suitable solvents are all solvents useful in Ziegler polymerization, such as aliphatic or cycloaliphatic hydrocarbons, for example pentane, hexane, heptane, cyclohexane and methylcyclohexane; aromatic hydrocarbons, for example benzene, toluene and xylene; or gasoline or hydrogenated Diesel oil fractions, which have been carefully freed from oxygen, sulfur compounds and humidity. Aliphatic and cycloaliphatic hydrocarbons are preferred.

The concentration of $CrO_3$ in the solution is suitably up to 30 millimols, preferably 5 to 25 millimols, per liter. With higher concentrations the danger of decomposition and flocculation of the chromate ester exists, especially under the action of light.

The reaction is carried out at a temperature of from 0° to 40° C., preferably 15° to 25° C., and lasts for 1 minute to 360 minutes depending on the temperature. The waterbinding agent, preferably anhydrous magnesium sulfate, and the excess $CrO_3$ are then removed by filtration.

Suitable carrier materials are porous oxides or mixed oxides of silicon and/or aluminum having a specific surface of from 50 to 1,000, preferably 100 to 800, and more preferably 150 to 650, $m^2/g$, and a pore volume in the range of from 0.2 to 3, preferably 0.4 to 3, and more preferably 0.6 to 2.7, ml/g. The particle size is in the range of from 1 to 500 μm, preferably 10 to 200 μm, and more preferably 20 to 100 μm. Depending on the specific surface and the thermal pretreatment, the number of hydroxyl groups is in the range of from 0.5 to 50, preferably 1 to 20 and more preferably 1.5 to 10, millimols per gram of carrier material. Oxides of this type are produced for specific use as carriers for supported catalysts and are available on the market.

Prior to the reaction of the carrier with the chromium compound it must be dried at a temperature of from 120° to 800° C., preferably 200° to 500° C., in order to remove any water bound by adsorption. After drying, the carrier material is stored in an inert gas such as nitrogen or argon with the exclusion of air and water.

For the reaction of the carrier material with the chromium compound the former is suspended in an inert diluent, the solution of the chromium compound is added at a temperature of from 0° to 40° C., preferably 15° to 25° C., and the two components are allowed to act on each other for 1 to 360 minutes, preferably 2 to 60 minutes. The proportion of chromium compound to carrier material is chosen in such a manner that 1 to 40, preferably 2 to 25, millimols of chromate ester are used per 100 g of carrier material. Under these conditions the chromium compound is quantitatively adsorbed on the carrier material. The reaction is complete when, after sedimentation of the carrier, no more chromium can be detected in the supernatant solution.

Next, the chromium compound fixed on the carrier is reacted in the same suspension, in the absence of an unsaturated polymerizable hydrocarbon, with an aluminum-organic compound.

It has been found that the aluminum-organic compound, used according to the invention for making catalyst component A has a great influence on the hydrogen sensitivity and, hence, on the regulation of the molecular weight.

Suitable aluminum organic compounds are aluminum trialkyls of the formula $AlR_3^4$ or aluminum dialkyl hydrides of the formula $AlR_2^4H$ in which $R^4$ denotes an alkyl radical having from 1 to 16, preferably from 2 to 4, carbon atoms, such as $Al(C_2H_5)_3$, $Al(C_2H_5)_2H$, $Al(C_3H_7)_2H$, $Al(i-C_4H_9)_3$ and $Al(i-C_4H_9)_2H$.

Especially suitable aluminum compounds are also those of the formula $R_2^4Al-OR^4$ in which $R^4$ has the above meaning, for example diethylethoxy aluminum, di-isobutylethoxy aluminum, di-isobutylmethoxy aluminum and di-isobutylbutoxy aluminum, preferably di-isobutylethoxy aluminum.

It is likewise possible to use polymeric aluminum-organic compounds consisting of structural units of the formula

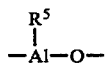

in which $R^5$ denotes an alkyl group having from 2 to 18, preferably from 4 to 12, carbon atoms, for example ethyl, propyl, isopropyl, butyl, isobutyl, pentyl, hexyl, isooctyl, and dodecyl. Compounds of this type can be prepared from the corresponding aluminum trialkyls, dialkyl hydrides and alkyl dihydrides by cautiously adding a calculated amount of water to the solution of such a compound in an inert solvent, for example as described above. In this reaction the molar proportion of water to aluminum alkyl is from 0.5 to 1 to 1.25:1, preferably 0.85:1 to 1.05:1, the reaction temperature being in the range of from 0° to 100° C., preferably about 10° to 65° C. The alkyl aluminum oxides obtained in this manner are polymeric compounds. A preferred compound of this class is formed by reacting $Al(i-C_4H_9)_3$ with water.

Further suitable aluminum-organic compounds are the reaction products of aluminum trialkyls or aluminum dialkyl hydrides, the alkyl radicals of which have from 1 to 16 carbon atoms, with dienes containing from 4 to 20 carbon atoms.

From among the aluminum-organic compounds specified above the dialkyl aluminum alkoxides give the best results.

As already mentioned above, the reaction of the chromium compound fixed on the carrier with the aluminum organic compound takes place in the absence of unsaturated polymerizable hydrocarbons in the solvent in which the chromate ester has been prepared. The concentration of the chromium compound is in the range of from 1 to 30, preferably 5 to 20, millimols per liter, the proportion of Cr to Al is in the range of from 1:1 to 1:50, preferably 1:2 to 1:20. The reaction temperature is of from 0° to 40° C., preferably from 15° to 25° C., and the reaction time ranges from 1 to 60 minutes, preferably 1 to 10 minutes. During the reaction the originally brown color of the carrier material turns green.

Catalyst component A produced in this manner is used, either directly in the form of the suspension or after removal of the diluent and drying, together with component B for the polymerization of 1-olefins.

Suitable components B (activator) are organic compounds of the metals of main groups I, II and III of the Periodic Table, preferably aluminum-organic compounds.

Besides the aluminum trialkyls, aluminum dialkyl hydrides, poly(alkyl aluminum oxides) and reaction products of aluminum trialkyls or aluminum dialkyl hydrides with dienes specified above, there can also be used as component B a chlorine-containing aluminum-organic compound such as dialkyl aluminum monochloride of the formula $R_2^4AlCl$ or an alkyl aluminum sesquichlorides of the formula $R_3^4Al_2Cl_3$ in which $R^4$ denotes an alkyl radical having from 1 to 16 carbon atoms, preferably 2 to 4 carbon atoms. Examples are $(C_2H_5)_2AlCl$, $(i-C_4H_9)_2AlCl$, $(C_2H_5)_3Al_2Cl_3$.

Polymeric compounds of the type

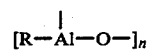

as described above are preferred. Especially good results are obtained with the reaction product of aluminum triisobutyl with 0.5 to 1.25 mols of water for each mol of $Al(i-C_4H_9)_3$.

The catalyst according to the invention is used to polymerize at least one 1-olefin of the formula $R^6$—$CH$=$CH_2$ in which $R^6$ denotes hydrogen or a linear or branches alkyl radical having from 1 to 10, preferably 1 to 8, carbon atoms, for example ethylene, propylene, butene-(1), hexene-(1), 4-methylpentene-(1) and octene-(1). It is preferred to polymerize ethylene alone or in the form of a mixture of at least 70% by weight of ethylene with at most 30% by weight of another 1-olefin of the above formula. Especially good results are obtained by polymerizing ethylene alone or a mixture of at least 92% by weight of ethylene and at most 8% by weight of another 1-olefin of the above formula.

The molecular weight of the polymer is regulated in known manner, preferably by adding hydrogen. The sensitivity of the catalyst can be varied by the selection of the aluminum-organic compound in the preparation of component A.

The polymerization is carried out in solution, in suspension or in the gaseous phase, either continuously or discontinuously, at a temperature of from 20° to 150° C., preferably 60° to 140° C. The pressure amounts to 0.5 to 50 bar, the, industrially-speaking, especially interesting range of from 1 to 40 bar being preferred.

In the polymerization the chromium compound (component A) is used in a concentration of from 0.001 to 1.5, preferably 0.005 to 0.1 mmol (calculated on Cr) per liter of dispersion medium or reactor volume. The metal-organic compound (component B) is used in a concentration of from 0.5 to 6 mmols of Al per liter of dispersion medium or reactor volume. In principle, higher concentrations are also possible.

The suspension-or solution-polymerization is carried out in an inert solvent as usual in the Ziegler low pressure process and as specified above.

The process of the invention for the manufacture of a catalyst has the special advantage that no washing liquids are obtained which have to be worked up.

The catalyst according to the invention gives a high yield of a polymer with broad molecular weight distribution and, therefore, a removal of the catalyst from the polymer is not necessary. The films made from the polymers are practically free from specks and, moreover, the polymers have an outstanding stability to light.

A further advantage of the catalyst according to the invention resides in the fact that by the treatment with the aluminum-organic compound of the chromate ester fixed on the carrier, in the absence of an unsaturated polymerizable hydrocarbon, the sensitivity of the system to hydrogen is greatly increased, whereby the manufacture of polymers having good processing properties is facilitated.

The following examples illustrate the invention.

EXAMPLES 1 to 4

With the exclusion of air and humidity, 3 g of anhydrous magnesium sulfate and then 0.5 g (5 mmols) of $CrO_3$ are added while stirring at 20° C. to a solution of 0.2964 g (4 mmols) of tert.-butanol in 150 ml of anhydrous hexane. Stirring of the suspension is continued for 20 minutes at 20° C., whereupon it is filtered under a protective gas. The red solution of tert.-butyl chromate is used for the following operations without further purification.

Silicic acid having a specific surface of about 300 $m^2/g$, a pore volume of 1.65 cc/g and a mean particle size of 100 μm is dried for 4 hours at 460° C. under argon in a fluidized bed and then maintained under argon.

26.5 g of the silicic acid treated in this manner are suspended in 100 ml of hexane at 20° C. and mixed, while stirring, with the solution of 2 mmols of tert.-butyl chromate in 150 ml of hexane under a blanket of argon. Next, 10 mmols of di-isobutylethoxy aluminum are added, the mixture is stirred for 10 minutes at 20° C. and then evaporated to dryness in vacuo in a rotary evaporator. Catalyst component A obtained in this manner is used for the following polymerization experiments.

0.5 Mol of aluminum triisobutyl are dissolved in 374 ml of a hydrogenated Diesel oil fraction (boiling range 130° to 170° C.) and, while vigorously stirring under argon, 0.5 mol of water are added dropwise at 20° C. The temperature is maintained at 20°±5° C. by cooling with ice. In this manner

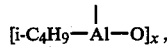

which is used as component B, is obtained.

A 1 liter autoclave is charged with 300 ml of a hydrogenated Diesel oil fraction (boiling range 130° to 170° C.), the air is removed by evacuating and forcing in hydrogen three times and the autoclave is heated to 85° C. Next, the amounts of activator (component B) and catalyst component A as indicated in the following Table 1 are added. Hydrogen is then forced in up to a pressure of 0.1 bar and ethylene up to a pressure of 6 bar and a total pressure of 6 bar is maintained during polymerization for 4 hours by introducing ethylene. The polyethylene powder obtained is then separated from the dispersion medium by filtration and dried in vacuo for 18 hours at 70° C. The test results are indicated in Table 1.

EXAMPLES 5 to 22

3 g of anhydrous magnesium sulfate and 0.5 g of chromium trioxide (5 mmols) are added to a solution of 0.85 g (3 mmols) of dimethylpentadecyl carbiol in 150 ml of hexane and the whole is stirred for 5 hours at 0° C. The magnesium sulfate and chromium trioxide in excess are then removed by filtration and 24 g of silicic acid having a surface of 300 $m^2/g$ and a pore volume of 1.65 cc/g, which has previously been dried for 4 hours at 460° C., are added, while stirring, to the red filtrate. Then the aluminum-organic compounds listed in Table 2 are added in the indicated amounts and the mixtures are stirred for 10 minutes at 20° C. under argon. The mixtures are then evaporated to dryness in vacuo in a rotary evaporator (except for Example 14). Catalyst components A obtained in this manner are used for the following ethylene polymerizations.

A 1 liter autoclave is charged with 500 ml of a hydrogenated Diesel oil fraction (boiling range 130° to 170° C.), the air is removed by evacuating and forcing in hydrogen three times and the autoclave is heated to 85° C. Next, the amounts of activator (component B) and catalyst component A indicated in Table 2 are added. Hydrogen is forced in up to the pressure indicated in Table 2 and then ethylene is introduced up to a pressure of 6 bar, which pressure is maintained during the polymerization periods given in Table 2 by adding ethylene. The polyethylene powder obtained is separated from the dispersion medium by filtration and dried in vacuo for 18 hours. The results are summarized in Table 2.

EXAMPLES 23 and 24

Under the conditions specified in Examples 1 to 4, 109.6 g of the same silicic acid are impregnated at 25° C. with 2 mmols of tert.-butyl chromate and then allowed to react with 20 mmols of di-isobutylethoxy aluminum. By evaporation in vacuo in a rotary evaporator the solid catalyst component A is obtained.

The polymerization is carried out in a 2 liter autoclave which is charged with 1,000 ml of hydrogenated Diesel oil (boiling range 130° to 170° C.), freed from air and heated to 85° C. Component B

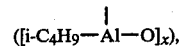

prepared from $Al(i-C_4H_9)_3$ and water as described in Examples 1 to 22, and catalyst component A are added in the amounts indicated in Table 3. Hydrogen is then forced in up to a pressure of 1 bar and ethylene is added until a pressure of 20 bar is reached. During the course of polymerization a total pressure of 20 bar is maintained by adding ethylene. After the polymerization periods as indicated in Table 3, the pressure of the autoclave is released and the polyethylene powder is separated from the dispersion medium by filtration. It is then dried for 18 hours at 70° C. in vacuo. The results are summarized in Table 3.

EXAMPLES 25 to 28

8.5 g of silicic acid having a particle size of less than 32 μm, a surface of 500 $m^2/g$ and a pore volume of 2.69 ml/g are impregnated with tert.-butyl chromate using 2 mmols of the chromium compound in 300 ml of hexane. 20 mmols of di-isobutylethoxy aluminum are then added to the suspension obtained. Catalyst component A obtained by evaporation in vacuo in a rotary evaporator is used for the following polymerization experiments, which are carried out in the same autoclave and with the same amounts of dispersion medium as used in Examples 23 and 24. The amount of activator (component B) and the polymerization temperature are likewise the same as in said examples. The hydrogen and ethylene partial pressure, the polymerization periods and the results are summarized in Table 4.

EXAMPLE 29

Silicic acid having a specific surface of about 300 m²/g, a pore volume of 1.65 cc/g and a mean particle size of 100 μm is dried for 4 hours at 460° C. under argon in a fluidized bed and kept under argon.

6 g of the silicic acid are suspended, while stirring at 20° C., in 50 ml of hexane and 0.5 mmols of tert.butyl chromate in 150 ml of hexane are added. 2.5 mmols of di-isobutylethoxy aluminum are then added and stirring of the mixture is continued for 10 minutes. In this manner catalyst component A is obtained.

For polymerization, a 200 liter vessel is charged with 100 liters of a hydrogenated Diesel oil fraction (boiling range 130° to 170° C.), freed from air by scavenging with nitrogen and heated to 85° C. Next, 0.75 mol of poly-isobutyl aluminum oxide as used in Examples 1 to 4 and catalyst component A are added in the form of the above-mentioned suspension. Ethylene is introduced as well as hydrogen in an amount such that the proportion of the latter in the gas space amounts to 8.5% with a total pressure of 6 bar. This pressure is maintained by continually introducing ethylene. After a polymerization period of 8 hours, the pressure in the autoclave is released; the polymer is separated from the dispersion medium by filtration and dried for 24 hours at 70° C. in vacuo.

The yield amounts to 32,500 g, corresponding to 8.125 g of polyethylene per mmol of Cr and hour.

| | |
|---|---|
| RSV | 2.98 dl/g |
| MFI 190/5 | 0.53 g/10 min. |
| MFI 190/15 | 6.5 g/10 min. |
| $\frac{\text{MFI 190/15}}{\text{MFR 190/5}} = 12.3$ | |
| $\frac{\overline{M}w}{\overline{M}n} = 10.7$ | |

COMPARATIVE EXAMPLE A

The procedure of Examples 25 to 28 is repeated with the exception that the tert.-butyl chromate fixed on silicic acid is not treated with di-isobutylethoxy aluminum. With 0.1354 g (0.0319 mmol) of chromium-containing carrier and 5 mmols of activator, 3,230 g of polyethylene/mmol of Cr·hr are obtained within 3 hours at a hydrogen pressure of 1 bar and an ethylene pressure of 19.0 bar. The polymer has a melt index MFI 190/5 of 0.01 g/10 minutes and is difficult to process.

Table 1

| Ex. | Catalyst g | Component A mmol Cr | Component B activator | mmol | Yield g PE1 mmol Cr · hr |
|---|---|---|---|---|---|
| 1 | 0.2941 | 0.0222 | Al(C$_2$H$_5$)$_3$ | 3 | 79 |
| 2 | 0.1663 | 0.0125 | Al(i-C$_4$H$_9$)$_3$ | 5 | 114 |
| 3 | 0.2350 | 0.0177 | Al-isoprenyl | 3 | 319 |
| 4 | 0.2251 | 0.0170 | [i-C$_4$H$_9$—Al—O—]$_x$ | 5 | 4503 |

Table 2

| Example | (4) | Component A SiO$_2$ g | comp. A | Cr mmol | Component B (activator) [i-C$_4$H$_9$—Al—O—]$_x$ mmol | H$_2$ bar | C$_2$H$_4$ bar | Polymer time hrs. | Yield g | gPE/ mmol Cr · hr | MFI 190/5 g/10min |
|---|---|---|---|---|---|---|---|---|---|---|---|
| 5 | a | 25.5 | 0.400 | 0.0235 | 20 | 2 | 4 | 2 | 216 | 4 590 | 1.07 |
| 6 | | | 0.3716 | 0.0219 | 20 | 1.5 | 4.5 | 4 | 152 | 1 738 | 0.68 |
| 7 | | | 0.3106 | 0.0183 | 20 | 0.5 | 5.5 | 4 | 166 | 2 271 | 0.48 |
| 8 | b | 22.5 | 0.400 | 0.0276 | 20 | 2 | 4 | 3 | 195 | 2 437 | 0.21 |
| 9 | c | 22.6 | 0.3047 | 0.0202 | 20 | 2 | 4 | 4 | 168 | 2 077 | 15.91 |
| 10 | d | 24.1 | 0.3659 | 0.0228 | 15 | 2 | 4 | 4 | 118 | 1 295 | 8.78 |
| 11 | e | 24.1 | 0.3949 | 0.0246 | 20 | 2 | 4 | 4 | 176 | 1 790 | 18.10 |
| 12 | | | 0.3975 | 0.0247 | 25 | 1 | 5 | 3 | 180 | 2 425 | 9.18 |
| 13 | | | 0.2625 | 0.0164 | 20 | 0 | 6 | 4 | 181 | 2 770 | 0.18 |
| 14 | (1) | | | 0.0250 | 25 | 2 | 4 | 4 | 197 | 1 970 | 21.80 |
| 15 | f | 24.3 | 0.4869 | 0.0301 | 20 | 2 | 4 | 4 | 176 | 1 464 | 1.40 |
| 16 | g | 24.0 | 0.3312 | 0.0207 | 15 | 2 | 4 | 3 | 143 | 2 399 | 6.24 |
| 17 | | | 0.2065 | 0.0129 | 20 | 0.5 | 5.5 | 3 | 174 | 4 494 | 1.91 |
| 18 | | | 0.2373 | 0.0148 | 20 | 1 | 5 | 4 | 197 | 3 321 | 3.35 |
| 19 | h | 24.0 | 0.2393 | 0.0150 | 20 | 2 | 4 | 4 | 48 | 0 802 | 3.72 |
| 20 | i | 24.0 | 0.2129 | 0.0133 | 20 | 2 | 4 | 4 | 69 | 1 296 | 6.14 |
| 21 | b | 22.5 | 0.4102 | 0.0273 | 20(2) | | | | no polymerization | | |
| 22 | e | 24.1 | 0.2510 | 0.0156 | 20(2) | | | | no polymerization | | | legends in Table 2
a = 1.5 mmol DMPDC(3) + 10 mmol Al(i-C$_4$H$_9$)$_3$
b = 1.5 mmol DMPDC + 40 mmol[i-C$_4$H$_9$—Al—O—]$_x$
c = 1.5 mmol DMPDC + 20 mmol (C$_2$H$_5$)$_2$Al—O—C$_2$H$_5$
d = 1.5 mmol DMPDC + 20 mmol[Al(i-C$_4$H$_9$)$_3$ + 10 mmol H$_2$O + 20 mmol C$_2$H$_5$OH]
e = 1.5 mmol DMPDC + 20 mmol (i-C$_4$H$_9$)$_2$Al—O—C$_2$H$_5$
f = 1.5 mmol DMPDC + 20 mmol (i-C$_4$H$_9$)$_2$Al—O—C(CH$_3$)$_2$(CH$_2$)$_{14}$ . CH$_3$
g = 1.5 mmol DMPDC + 20 mmol (C$_2$H$_5$)$_2$Al—OCH$_3$
h = 1.5 mmol DMPDC + 20 mmol (i-C$_4$H$_9$)$_2$Al—O—iC$_4$H$_9$
i = 1.5 mmol DMPDC + 20 mmol (i-C$_4$H$_9$)$_2$Al—OCH$_3$
(1) used as dispersion
(2) (i-C$_4$H$_9$)$_2$Al—O—C$_2$H$_5$
(3) DMPDC = [CH$_3$—(CH$_2$)$_{14}$ . C(CH$_3$)$_2$—O—]$_2$CrO$_2$ (dimethyl pentadecyl carbinol chromate)
(4) pretreatment

Table 3

| Example | Catalyst g | component A mmol Cr | Component B activator mmol | polym. time hrs. | Yield g PE/mmol Cr . hr | MFI 190/5 g/10 min. | MFI 190/15 g/10 min. | MFI 190/15 / MFI 190/5 |
| --- | --- | --- | --- | --- | --- | --- | --- | --- |
| 23 | 0.1867 | 0.0034 | 10 | 3.5 | 29 438 | 0.29 | 3.3 | 11.4 |
| 24 | 0.0821 | 0.0015 | 5 | 8 | 18 272 | 0.27 | 3.1 | 11.5 |

Table 4

| Example | Catalyst g | component A mmol Cr | Component B activator mmol | polym. time hrs. | H₂ bar | C₂H₄ bar | Yield g PE/mmol Cr . hr | MFI 190/5 g/10 min. | MFI 190/15 g/10 min. | MFI 190/15 / MFI 190/5 |
| --- | --- | --- | --- | --- | --- | --- | --- | --- | --- | --- |
| 25 | 0.2510 | 0.0593 | 5 | 2 | 0.5 | 9.5 | 2 724 | 1.27 | 11.4 | 9.0 |
| 26 | 0.1148 | 0.0271 | 5 | 2 | 1.0 | 19.5 | 4 517 | 0.65 | 6.2 | 9.6 |
| 27 | 0.2787 | 0.0658 | 5 | 3 | 0.5 | 9.5 | 2 015 | 1.05 | 9.48 | 9.0 |
| 28 | 0.1340 | 0.0316 | 5 | 3 | 1.0 | 19.0 | 3 433 | 0.56 | 5.58 | 9.9 |

What is claimed is:

1. A process for the production of a catalyst, which comprises reacting, in the absence of water and at a temperature of from 0° to 40° C., a chromate ester of the formula $$(RO)_2CrO_2,$$

wherein R is tertiary alkyl or aralkyl of from 4 to 24 carbon atoms, with an anhydrous carrier selected from the group consisting of oxides of silicon, oxides of aluminum and mixtures thereof; treating the reaction product, in the absence of an unsaturated polymerizable hydrocarbon and at a temperature of from 0° to 40° C., with a first aluminum-organic compound selected from the group consisting of aluminum trialkyls, aluminum dialkyl hydrides, aluminum dialkyl alkoxides, reaction products of aluminum trialkyls with dienes, reaction products of aluminum dialkyl hydrides with dienes, and poly-alkyl-aluminum oxides, in a proportion of Cr to Al of 1:1 to 1:50, and mixing said treated reaction product with a second aluminum-organic compound.

2. A catalyst produced by a process as defined in claim 1.

3. A process for the production of a catalyst, which comprises reacting, in the absence of water and at a temperature of from 0° to 40° C., a chromate ester of the formula $$(RO)_2CrO_2,$$

wherein R is tertiary alkyl or aralkyl of from 4 to 24 carbon atoms, with a carrier previously dried at a temperature of from 120° to 800° C. to remove all water adsorbed thereon and selected from the group consisting of oxides of silicon, oxides of aluminum and mixtures thereof; treating the reaction product, in the absence of an unsaturated polymerizable hydrocarbon and at a temperature of from 0° to 40° C., with a first aluminum-organic compound selected from the group consisting of aluminum trialkyls, aluminum dialkyl hydrides, aluminum dialkyl alkoxides, reaction products of aluminum trialkyls with dienese, reaction products of aluminum dialkyl hydrides with dienes, and poly-alkyl-aluminum oxides, in a proportion of Cr to Al of 1:1 to 1:50; and mixing said treated reaction product with a second aluminum-organic compound.

4. A catalyst produced by a process as defined in claim 3.

5. A process as defined in claim 1, wherein R is tertiary alkyl or aralkyl of from 4 to 19 carbon atoms.

6. A catalyst produced by a process as defined in claim 5.

7. A process as defined in claim 1, wherein said carrier has a specific surface of from 50 to 1000 m²/g, a pore volume in the range of from 0.2 to 3 ml/g, a particle size in the range of from 1 to 500 μm, and a hydroxyl group content in the range of from 0.5 to 50 millimols per gram of carrier.

8. A catalyst produced by a process as defined in claim 7.

9. A process as defined in claim 7, wherein the carrier has a specific surface of from 100 to 800 m²/g, a pore volume in the range of from 10 to 200 μm and a hydroxyl group content in the range of from 1 to 20 millimols per gram of carrier.

10. A catalyst produced by a process as defined in claim 9.

11. A process as defined in claim 9, wherein the carrier has a specific surface of from 150 to 650 m²/g, a pore volume in the range of from 0.6 to 2.7 ml/g, a particle size in the range of from 20 to 100 μm and a hydroxyl group content in the range of from 1.5 to 10 millimols per gram of carrier.

12. A catalyst produced by a process as defined in claim 11.

13. A process as defined in claim 1, wherein the chromate ester is reacted with the carrier for a period of from 1 to 360 minutes in a proportion of from 1 to 40 millimols of chromate ester per 100 g of carrier.

14. A catalyst produced by a process as defined in claim 13.

15. A process as defined in claim 13, wherein the reaction of chromate ester and carrier is at a temperature of from 15° to 25° C., the reaction period is of from 2 to 60 minutes, and the proportion is of from 2 to 25 millimols of chromate ester per 100 g of carrier.

16. A catalyst produced by a process as defined in claim 15.

17. A process as defined in claim 1, wherein said first aluminum-organic compound is selected from the group consisting of a compound of the formula $$AlR_3^4, \ AlR_2^4H \ \text{and} \ R_2^4Al-OR^4,$$

R⁴ being alkyl of from 1 to 16 carbon atoms, the reaction products of aluminum trialkyls with dienes and of aluminum dialkyl hydrides with dienes, each said alkyl being of from 1 to 16 carbon atoms and each diene being of from 4 to 20 carbon atoms, and compounds of the formula

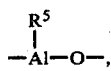

wherein $R^5$ is alkyl of from 2 to 18 carbon atoms.

18. A catalyst produced by a process as defined in claim 17.

19. A process as defined in claim 17, wherein $R^4$ is alkyl of from 2 to 4 carbon atoms and $R^5$ is alkyl of from 4 to 12 carbon atoms.

20. A catalyst produced by a process as defined in claim 19.

21. A process as defined in claim 1, wherein the treatment with the first aluminum-organic compound is for a period of from 1 to 60 minutes.

22. A catalyst produced by a process as defined in claim 21.

23. A process as defined in claim 21, wherein, for the treatment with the first aluminum-organic compound, the reaction product of the chromate ester and carrier is present in a proportion of chromium to aluminum of from 1:2 to 1:20, the treatment with the first aluminum-organic compound is at a temperature of from 15° to 25° C. and the treatment time is of from 1 to 10 minutes.

24. A catalyst produced by a process as defined in claim 23.

25. A process as defined in claim 1, wherein the second aluminum-organic compound is a compound of the formula $AlR_3^4$, $AlR_2^4H$, $R_2^4Al-OR^4$, $R_2^4AlCl$ or $R_3^4Al_2Cl_3$ wherein $R^4$ is alkyl of from 1 to 16 carbon atoms, or a polymeric aluminum-organic compound consisting of monomers of the formula

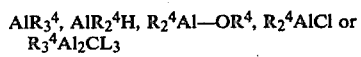

wherein $R^5$ is alkyl of from 2 to 18 carbon atoms, or a reaction product of an aluminum trialkyl or aluminum dialkyl hydride, each alkyl of which is of from 1 to 16 carbon atoms, with a diene of from 4 to 20 carbon atoms.

26. A catalyst produced by a process as defined in claim 25.

27. A process as defined in claim 25, wherein $R^4$ is alkyl of from 2 to 4 carbon atoms and $R^5$ is alkyl of from 4 to 12 carbon atoms.

28. A catalyst produced by a process as defined in claim 27.

29. A process as defined in claim 1, wherein the second aluminum-organic compound is mixed with said treated reaction product in a proportion of from 0.001 to 1.5 millimols chromium per 0.5 to 6 millimols aluminum-organic compound.

30. A catalyst produced by a process as defined in claim 29.

31. A process as defined in claim 29, wherein the proportion is from 0.005 to 0.1 millimols chromium per 0.5 to 6 millimols of aluminum-organic compound.

32. A catalyst produced by a process as defined in claim 31.

* * * * *